United States Patent
Presetschnik et al.

(10) Patent No.: US 9,810,137 B2
(45) Date of Patent: Nov. 7, 2017

(54) VEHICLE COOLING CIRCUIT

(71) Applicant: Liebherr-Transportation Systems GmbH & Co. KG, Korneuburg (AT)

(72) Inventors: Andreas Presetschnik, Vienna (AT); Klaus Hense, Traiskirchen (AT)

(73) Assignee: Liebherr-Transportation Systems GmbH & Co. KG, Korneuburg (AT)

( * ) Notice: Subject to any disclaimer, the term of this patent is extended or adjusted under 35 U.S.C. 154(b) by 206 days.

(21) Appl. No.: 14/606,917

(22) Filed: Jan. 27, 2015

(65) Prior Publication Data

US 2015/0211412 A1 Jul. 30, 2015

(30) Foreign Application Priority Data

Jan. 27, 2014 (DE) .................. 10 2014 001 022

(51) Int. Cl.
  *F01P 7/14* (2006.01)
  *F01P 9/06* (2006.01)
  *F01P 3/20* (2006.01)
  *F01P 5/02* (2006.01)
  *H01M 10/625* (2014.01)
  (Continued)

(52) U.S. Cl.
  CPC .............. *F01P 9/06* (2013.01); *B60L 1/003* (2013.01); *B60L 1/02* (2013.01); *B60L 11/1874* (2013.01); *F01P 3/20* (2013.01); *F01P 5/02* (2013.01); *H01M 10/613* (2015.04); *H01M 10/625* (2015.04); *H01M 10/6569* (2015.04); *H01M 10/663* (2015.04); *B60L 2240/36* (2013.01); *B60L 2240/545* (2013.01); *F01P 2007/146* (2013.01); *H01M 2220/20* (2013.01); *Y02T 10/705* (2013.01); *Y02T 10/7005* (2013.01)

(58) Field of Classification Search
  CPC .... F01P 2007/146; F01P 11/0295; F01P 3/12; F01P 2003/2214
  USPC ......................................... 123/41.1
  See application file for complete search history.

(56) References Cited

U.S. PATENT DOCUMENTS 2,779,171 A    1/1957   Lindenblad
4,415,847 A   11/1983   Galloway
(Continued)

FOREIGN PATENT DOCUMENTS

DE    102004041252 A1    3/2006
EP          0467189 B1    2/1995
(Continued)

OTHER PUBLICATIONS

German Patent and Trademark Office, Search Report of DE102014001022.8, dated Oct. 1, 2014, 10 pages. See p. 2.

*Primary Examiner* — Jacob Amick
*Assistant Examiner* — Charles Brauch
(74) *Attorney, Agent, or Firm* — McCoy Russell LLP

(57) ABSTRACT

The present disclosure relates to a vehicle cooling circuit for cooling a temperature-increasing device, in particular a battery, by means of a coolant conducted in a coolant circuit, wherein the coolant circuit has a heat exchanger configured as an evaporator via which the coolant circuit is coupled to a cooling medium circuit. In accordance with the present disclosure, the chiller is arranged downstream of the heat exchanger in the direction of flow of the coolant in the coolant circuit. Furthermore a bypass valve is arranged in the coolant line such that the coolant can be conducted fully or partially past the chiller.

13 Claims, 6 Drawing Sheets

(51) Int. Cl.
  *H01M 10/663*   (2014.01)
  *H01M 10/6569*  (2014.01)
  *H01M 10/613*   (2014.01)
  *B60L 1/00*     (2006.01)
  *B60L 1/02*     (2006.01)
  *B60L 11/18*    (2006.01)

(56) References Cited

U.S. PATENT DOCUMENTS

| | | | | |
|---|---|---|---|---|
| 4,632,178 | A | * | 12/1986 | Hirano .................. F01P 3/20 123/41.08 |
| 5,040,377 | A | * | 8/1991 | Braun .................. F25B 49/027 165/299 |
| 6,349,552 | B2 | | 2/2002 | Shimoda et al. |
| 2002/0005268 | A1 | * | 1/2002 | Noda ................. B60H 1/00878 165/42 |
| 2005/0022983 | A1 | * | 2/2005 | Kadle ................ B60H 1/00878 165/202 |
| 2010/0009246 | A1 | * | 1/2010 | Maitre ................ H01M 10/625 429/62 |
| 2012/0024517 | A1 | | 2/2012 | Imanishi et al. |
| 2012/0085512 | A1 | * | 4/2012 | Graaf ................ B60H 1/00278 165/51 |
| 2012/0111046 | A1 | | 5/2012 | Wilmot, Jr. et al. |
| 2012/0131946 | A1 | * | 5/2012 | Chellan ............... F01P 11/0276 62/434 |
| 2012/0291459 | A1 | | 11/2012 | Millar et al. |

FOREIGN PATENT DOCUMENTS

| | | |
|---|---|---|
| EP | 1266779 B1 | 1/2008 |
| JP | U3079839 U | 6/2001 |
| JP | 20043753 A | 1/2004 |
| JP | 2006194518 A | 7/2006 |

\* cited by examiner

VEHICLE COOLING CIRCUIT

CROSS REFERENCE TO RELATED APPLICATION

This application claims priority to German Patent Application No. 10 2014 001 022.8 entitled "Vehicle Cooling Circuit", filed Jan. 27, 2014, which is hereby incorporated by reference in its entirety for all purposes.

TECHNICAL FIELD

The present disclosure relates to a vehicle cooling circuit for cooling a temperature-increasing device in the vehicle.

BACKGROUND AND SUMMARY

There is a problem in the development of new vehicle generations where temperature-increasing devices such as batteries or fuel cells are used. These temperature-increasing devices have to be cooled during operation. In this respect, considerably higher thermal loads have to be dissipated than was necessary in conventional vehicles with internal combustion engines. Since the dissipation of the thermal loads would require very large heat exchangers and very high air volume flows of cooling air, it is known from U.S. Pat. No. 4,415,847 A, for example, to provide a coolant circuit which is combined with a cooling medium circuit for cooling a temperature-increasing device by means of a coolant conducted in a coolant circuit. The design of the corresponding vehicle cooling circuit of U.S. Pat. No. 4,415,847 A can be seen schematically from FIG. 1. Here, a coolant circuit 10 is coupled to a cooling medium circuit 12 via a heat exchanger 14 configured as an evaporator. The coolant circuit 10 has a coolant line 16 through which the coolant is transported. A battery 18 is cooled via the coolant. The coolant itself is drawn from a reservoir 17 by means of a pump 20. The coolant is cooled down by means of the cooling medium cooled in the cooling medium circuit 12 in the heat exchanger 14 configured as an evaporator. The cooling medium circuit has a cooling medium line 22, a compressor 24, a condenser 26 and a relief valve 28. The condenser 26 can be acted on by cooling air via a fan 30. A bypass valve 32 with which the coolant in the coolant line 16 can be fully or partially conducted past the heat exchanger 14 configured as an evaporator is provided in the coolant line 16. This coolant circuit loop has the disadvantage that the mass flow of cooling liquid which flows through the evaporator of the chilling circuit cannot be reduced as desired. A minimum chilling performance has to be introduced into the cooling circuit dependent on the operating point. This has the result that a complex and/or expensive part-load regulation (not shown in any more detail here) has to be provided in the cooling medium circuit coupled to the coolant circuit.

A vehicle cooling circuit is known from DD 1 266 779 B1 such as is shown in principle in FIG. 2. A coolant circuit 10 is here also coupled to a cooling medium circuit 12 via a heat exchanger 14 configured as an evaporator. The cooling medium circuit 12 is in turn of a conventional design and has a cooling medium line 22, a compressor 24, a condenser 26, a relief valve 28 and a fan 30. The coolant circuit in turn, for example, cools a battery 18, wherein the coolant flows through a coolant line 16 and is circulated via a pump 20. Corresponding to EP 1 266 779 B1, a chiller 34 is additionally provided in the coolant circuit and, together with the condenser 26 of the cooling medium circuit, can be acted on by cooling air. Viewed in the direction of flow of the coolant circulated by the pump 20, the chiller 34 is arranged upstream of the heat exchanger 14 and downstream of the temperature-increasing device (for example, the battery 18). Due to this, the chiller cannot be used to output chilling power possibly introduced at too high a degree by the evaporator into the coolant circuit to the environment again in part-load operation.

It is the object of the present disclosure to further develop a vehicle cooling circuit of the category for cooling a temperature-increasing device, in particular a battery, by means of a coolant conducted in a coolant circuit such that a complicated part-load regulation in the chilling circuit can largely be dispensed with and thus the total system architecture can be simplified.

This object is achieved in accordance with the present disclosure by the combination of the features provided. Accordingly, a vehicle cooling circuit is provided for cooling a temperature-increasing device, in particular a battery, by means of a coolant conducted in a coolant circuit, wherein the coolant circuit has a coolant line, a chiller, a coolant pump and a heat exchanger configured as an evaporator via which the coolant circuit is coupled to a cooling medium circuit which additionally has a cooling medium line, a compressor, a condenser and a relief valve. In accordance with the present disclosure, the chiller is arranged downstream of the heat exchanger in the direction of flow of the coolant in the coolant circuit. In this respect, a bypass valve is arranged in the coolant line such that the coolant can be conducted fully or partially past the chiller.

The individual components are connected to one another by the arrangement of the vehicle cooling circuit in accordance with the present disclosure such that, on the use of a chilling circuit without the necessity of a part-load solution which would result in an adaptation of the chilling performance provided, the coolant can be cooled to the desired coolant inlet temperature for the temperature-increasing device to be cooled. In the ideal case, even the additionally required components for the part-load regulation of a chilling circuit can be saved, whereby the system architecture of the total vehicle cooling circuit is substantially simplified.

Preferred embodiments of the present disclosure result from the dependent claims following on from the main claim.

Both the chiller of the coolant circuit, on the one hand, and the condenser of the cooling medium circuit, on the other hand, can thus be associated with a common cooling air flow.

The cooling air flow is advantageously generated by a fan. Instead or additionally, the cooling air flow of the airstream during the locomotion of the vehicle can be used.

In accordance with a particular embodiment of the present disclosure, the chiller can be arranged in front of the condenser in the cooling air flow.

Another preferred embodiment of the present disclosure can also be present in that the chiller is arranged after the condenser in the cooling air flow.

Finally, it can be advantageous if an additional bypass valve is arranged in the coolant line such that the coolant can be fully or partly conducted past the heat exchanger.

Further features, details and advantages of the present disclosure result from the embodiments shown in the drawing.

DETAILED DESCRIPTION

Figure 1:
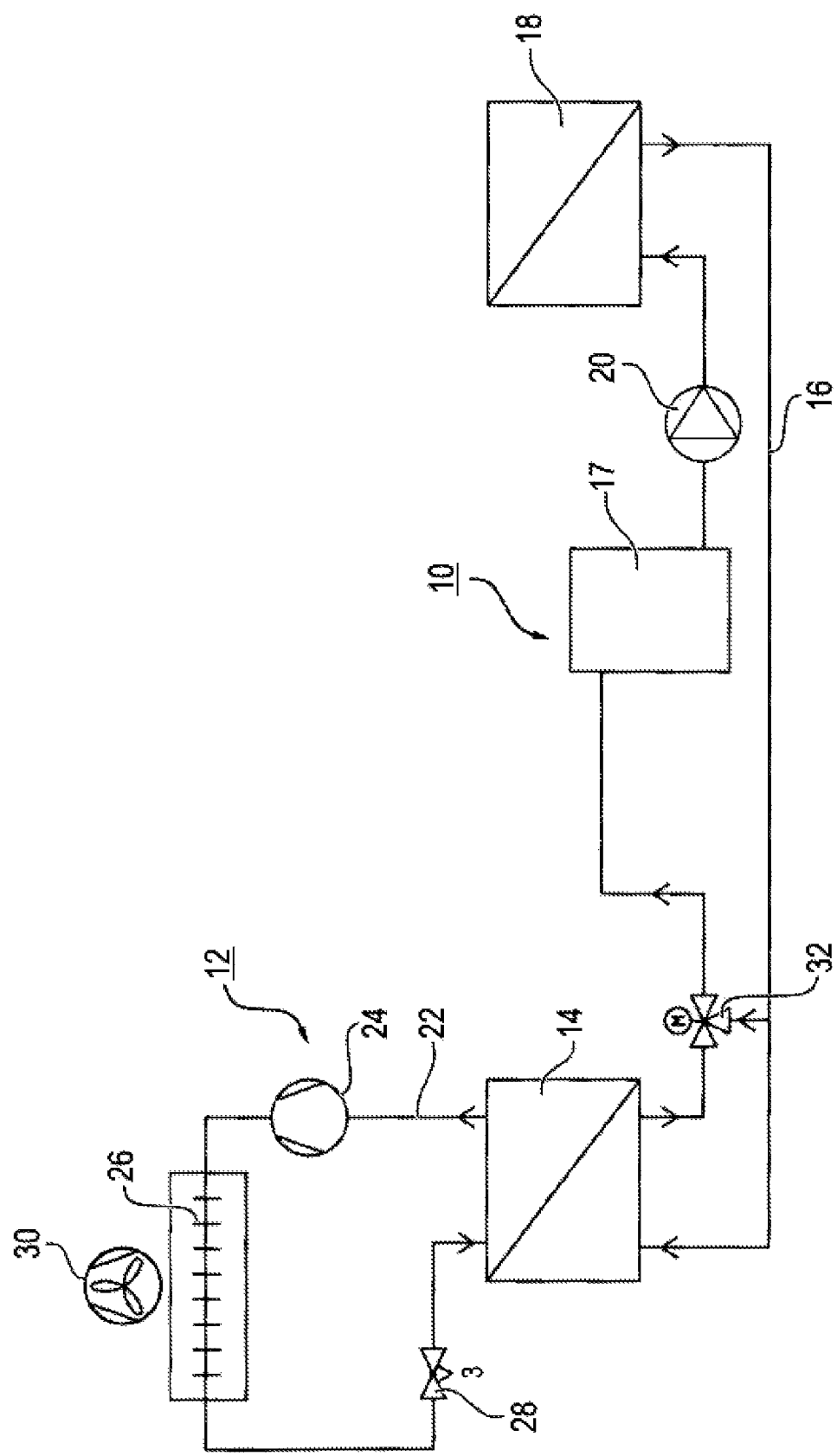
FIG. 1 shows a vehicle cooling circuit of the prior art such as is known from U.S. Pat. No. 4,415,847 A.
Figure 2:
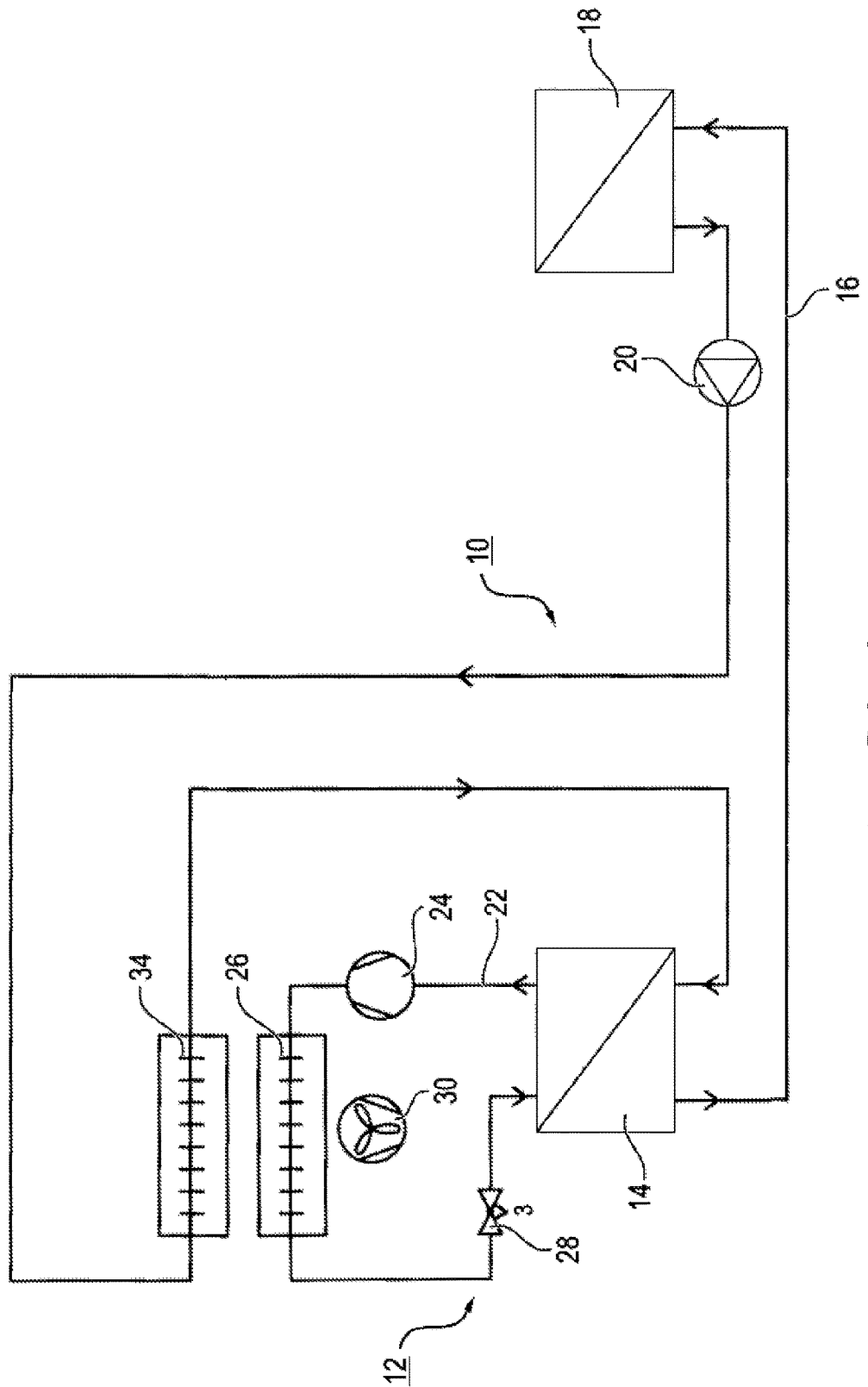
FIG. 2 shows a vehicle cooling circuit such is known from the prior art in accordance with EP 1 266 779 B1.
Figure 3:
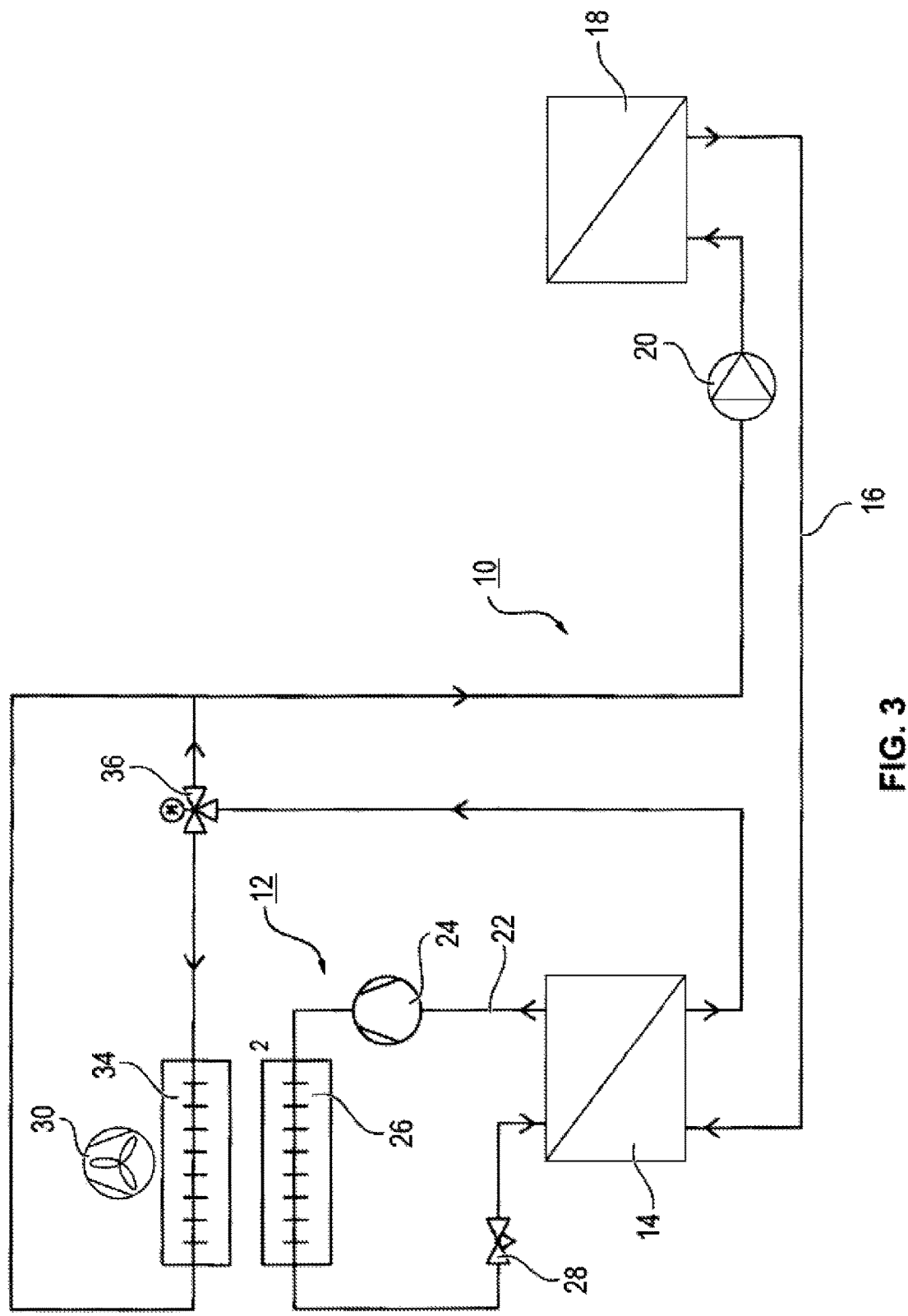
FIG. 3 shows a first embodiment of a vehicle cooling circuit in accordance with the present disclosure.

The coolant circuit 10 in accordance with the present disclosure in accordance with the first embodiment such as is shown in FIG. 3 is coupled to a cooling medium circuit 12 via a heat exchanger 14 configured as an evaporator. The coolant circuit has a coolant line 16 in which the coolant is conveyed via a pump 20 in the direction of the arrow in accordance with FIG. 3. A temperature-increasing device such as a battery 18 of an electric vehicle 100 is cooled via the coolant. Electric vehicle 100 may include an automobile, rail vehicle, or another electrically powered vehicle. A chiller 34 is furthermore provided which is cooled by means of a cooling air flow which is cooled via the airstream of the vehicle and/or via a fan 30. A further cooling of the coolant circuit takes place via the heat exchanger 14 which is configured as an evaporator of the cooling medium circuit 12 thereby coupling the cooling medium circuit to the coolant circuit. The cooling medium circuit 12 comprises a heat exchanger 14 configured as an evaporator, a cooling medium line 22, a compressor 24, a condenser 26 and a relief valve 28. The aforesaid term "evaporator" is used in the connection shown here beyond the actual meaning of the word. If, for example, carbon dioxide is used as a coolant, the "condenser" 26 of the cooling medium circuit 12 acts as a "gas chiller".

As can be seen from FIG. 3, the chiller 34 is arranged, viewed in the direction of flow of the coolant in the coolant circuit (cf. the direction of the arrow), downstream of the heat exchanger 14. Furthermore, a chiller bypass valve 36 is arranged in the coolant line 16 such that the coolant can be conducted fully or partially past the chiller 34.

In the embodiment in accordance with FIG. 3, the condenser 26 is arranged in front of the chiller 34 in the air flow which is generated, for example, by the fan 30. A greater temperature difference at the chiller can hereby be generated. This increases the possible capacity of the "cold dissipation" at the chiller 34 due to an active cooling medium circuit 12.

Figure 4:
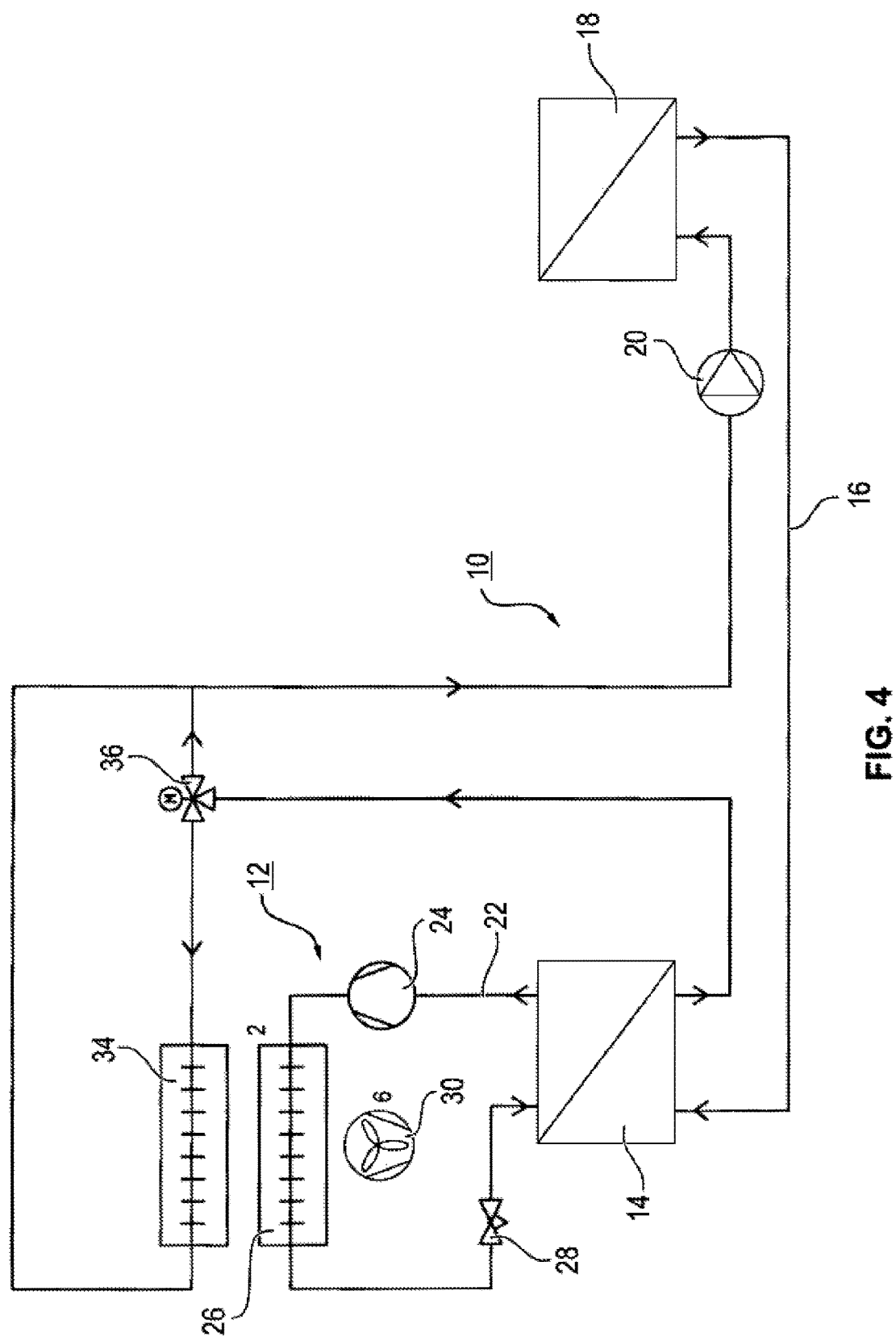
FIG. 4 shows a second embodiment of a vehicle cooling circuit in accordance with the present disclosure.

The embodiment in accordance with FIG. 4 corresponds to the embodiment in accordance with FIG. 3. In the embodiment of FIG. 4 the chiller 34 is arranged in front of the condenser 26 in the air flow generated by the fan 30. Thus, a smaller temperature differential and a smaller capacity of "cold dissipation" results at the chiller 34 due to an active cooling medium circuit 12. On the other hand, there is the possibility at very high environmental temperatures to lower the condensation temperature by active cooling of the air flow to the condenser 26 using the chiller 34 to ensure the functionality of the vehicle cooling circuit for a comparatively longer time at high environmental temperatures. The system architecture shown here opens up the possibility of regulating the condensation temperature in the cooling medium circuit 12.

Figure 5:
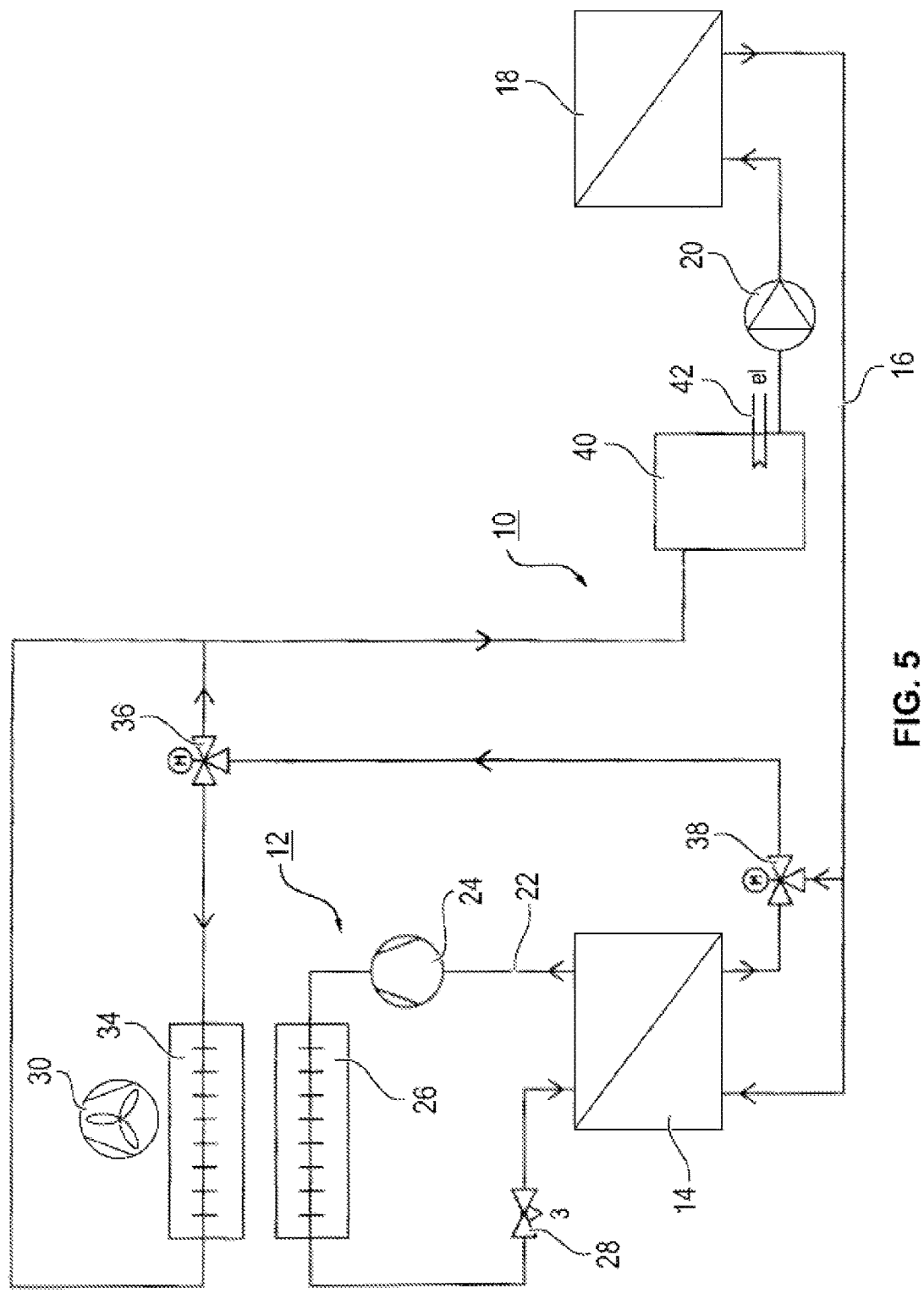
FIG. 5 shows a third embodiment of a vehicle cooling circuit in accordance with the present disclosure.

Finally, a third embodiment of the vehicle coolant circuit in accordance with the present disclosure is illustrated in FIG. 5. The design substantially corresponds to that in accordance with FIG. 3. However, an evaporator bypass valve 38 is provided which is arranged in the coolant line 16 such that the coolant can be conducted fully or partly past the heat exchanger 14. A further possibility of part-load regulation is opened up by this evaporator bypass valve 38 in which the heat exchanger 14 configured as an evaporator can be bypassed.

In addition, a liquid coolant container 40 can be provided in which the coolant can be temperature controlled to a desired temperature level via an electrically operated resistance heater 42.

Figure 6:
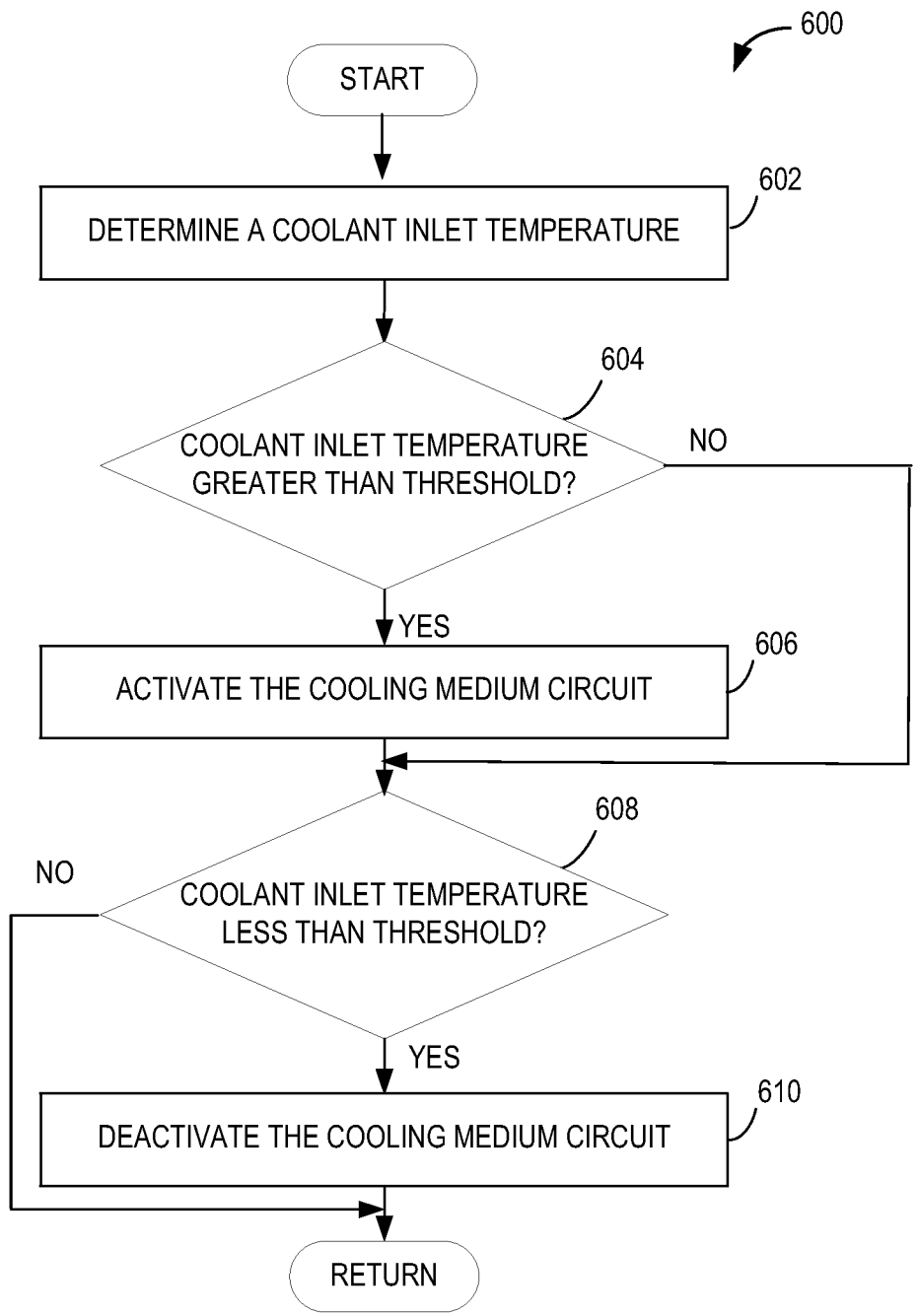
FIG. 6 schematically illustrates a method of operating a vehicle cooling circuit in accordance with the present disclosure.

Different operating modes can be run with the vehicle coolant circuit in accordance with the present disclosure. FIG. 6 illustrates a method 600 of operating a vehicle cooling system in accordance with an embodiment of the present disclosure. Method 600 may be performed by the controller 138, sensors 140, and actuators 142 illustrated in FIGS. 3-5. For example, sensors 140 may provide temperature information such as coolant inlet temperature and environmental temperature, for example. Controller 138 may compare the temperature information to an associated threshold and change the operating mode of the vehicle cooling system through actuators 142. Actuators 142 may be configured to change a position of one or more valves and/or bypass valves of the vehicle coolant circuit, change a speed of a fan, start or stop one or more of the coolant pumps or cooling medium compressors, or any other feature of the vehicle coolant circuit.

Returning to FIG. 6, at 602, method 600 includes determining a coolant inlet temperature. The coolant inlet temperature may be determined by a temperature sensor at the coolant inlet of a battery of the vehicle, for example. It will be appreciated that the coolant inlet temperature may be determined continuously to insure coolant inlet temperature is maintained at the required threshold temperature.

At 604, method 600 includes comparing the coolant inlet temperature to a threshold. If the coolant inlet temperature is greater than the threshold, then the cooling medium circuit is activated at 606. If the coolant inlet temperature is not greater than the threshold, then method 600 continues to 608.

At 608, method 600 includes comparing the coolant inlet temperature to the threshold. If the coolant inlet temperature is less than the threshold, then the cooling medium system is deactivated at 610.

Specific operating modes of the coolant circuit and cooling medium circuit of the vehicle cooling circuit associated with method 600 will now be described with reference to the embodiments illustrated in FIGS. 3-5. In accordance with a first operating mode, in which the environmental temperature is higher than the required coolant inlet temperature into the battery 18, the cooling medium circuit 12 is active. This means that the compressor 24 is switched on and that in the embodiment variant in accordance with FIG. 5 the evaporator bypass valve 38 opens the path through the heat exchanger 14 configured as an evaporator, with the evaporator bypass being closed. The chiller bypass valve 36 opens the chiller bypass and closes the path to the chiller 34.

If the cooling medium circuit 12 has a coolant inlet temperature lower than that required at the outlet from the heat exchanger 14, the temperature of the coolant can be increased by partial opening of the evaporator bypass valve 38. The maximum permitted degree of opening of the evaporator bypass valve 38 depends on the operating point of the cooling medium circuit and on the compressor 24 used. If the required coolant inlet temperature is still higher than the provided coolant temperature, the inflow to the chiller 34 can be opened by a step-wise opening of the chiller bypass valve 36, with the chiller bypass line simultaneously increasingly being closed in a step-wise manner. The temperature of the coolant now partially conducted via the chiller 34 can hereby be further increased up to the required coolant inlet temperature.

If the coolant circuit delivers a coolant inlet temperature higher than that required, the coolant temperature can again be lowered to the minimally possible temperature by reversing the above-named steps, with a minimal temperature being achieved here in that the compressor 24 is switched on, in that the coolant is conducted completely via the heat exchanger 14, and in that the largely cooled coolant is not conducted via the chiller 34.

In the event that the environmental temperature is lower than the required coolant inlet temperature into the battery, the transferred cooling power may be sufficient at the chiller under certain circumstances to lower the temperature of the coolant below the required coolant inlet temperature. In this case, the cooling medium circuit 12 does not have to be activated. The compressor 24 can remain switched off and the evaporator bypass valve conducts the coolant past the heat exchanger 14 configured as an evaporator. The chiller bypass valve 36 is connected such that the total cooling medium flow is conducted via the chiller 34. If the cooling circuit continues to deliver a coolant inlet temperature lower than that required at the battery 18, the temperature of the coolant can be further increased up to the required coolant inlet temperature by a step-wise opening of the chiller bypass valve 36.

If the environmental temperature is admittedly lower than the required coolant inlet temperature into the battery, but the transferred cooling power at the chiller 34 is not sufficient to cool the coolant to the required coolant inlet temperature at the inlet of the battery, the cooling medium circuit 12 is instead activated in that the compressor 24 is switched on. The evaporator bypass valve 38 is simultaneously connected such that the coolant is conducted via the heat exchanger 14 configured as an evaporator. The part-load regulation then takes place in accordance with the initially explained operating mode.

In a further operating mode, the functionality can be ensured at very high external temperatures using the embodiment variant of the vehicle coolant circuit shown in FIG. 4. In this embodiment variant, the condenser 26 is arranged in the air flow after the chiller 34. Unlike the circuit in accordance with EP 1 266 779 B1, the possibility results here of actively cooling the air flow to the condenser 26 using chiller 34.

It must be stated for explanation in this respect that the required coolant inlet temperature can no longer be reached from a defined outside temperature onward (for example 45° C.). On the other hand, there is the demand that the cooling medium circuit remains functional up to a maximum outside temperature (of 55° C., for example).

If no possibility—of any form whatsoever—is provided for power reduction in the cooling medium circuit, the cooling medium circuit has to be configured such that it can also be operated at defined maximum temperatures at full-load operation. This means that a larger condenser 26 or an increased air flow through the condenser 26 is necessary.

It is, however, possible in the system architecture in accordance with FIG. 4 to lower the condensation pressure which is a limiting parameter for the functionality of the vehicle cooling circuit at high environmental temperatures. For this purpose, some of the chilling power which is introduced into the cooling circuit at the heat exchanger 14 is used at the chiller to lower the temperature of the air flow at the condenser inlet and thus also the condensation temperature (corresponds to the condensation pressure) for the heat dissipation. The chiller bypass valve 36 opens the path through the chiller 34 step-wise and closes the bypass line.

The integration of a liquid coolant container 40 for receiving coolant into the cooling circuit is shown by way of example with reference to the embodiment in accordance with FIG. 5. This embodiment variant can also be provided in the embodiments in accordance with FIG. 3 or 4. This additional liquid coolant container 40 can likewise be dispensed with in the embodiment in accordance with FIG. 5.

The integration of the electrically operated resistance heater 42 in the liquid container is likewise only selectively provided. The coolant inlet temperature can, for example, be kept at a minimal temperature and also increased again as necessary via this heating.

In accordance with a further embodiment, the speed of fan 30 may be adjustable or include variable speed settings to vary the air speed and/or quantity of the cooling air flow.

The control methods and routines disclosed herein may be stored as executable instructions in non-transitory memory of the controller and carried out by the controller in combination with the various structural system elements, such as actuators, valves, etc. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system carried out in combination with the described elements of the structural system.

It will be appreciated that the configurations and routines disclosed herein are exemplary in nature, and that these specific embodiments are not to be considered in a limiting sense, because numerous variations are possible.

The invention claimed is:

1. A system for a vehicle, comprising:
a vehicle cooling circuit for cooling a temperature-increasing device via a coolant conducted in a coolant circuit, wherein the coolant circuit includes a coolant line, at least one chiller, a coolant pump, and at least one heat exchanger configured as an evaporator coupling the coolant circuit to a cooling medium circuit including a cooling medium line, at least one compressor, at least one condenser, and at least one relief valve, wherein the at least one chiller is arranged downstream of the at least one heat exchanger in a direction of flow of the coolant in the coolant circuit, wherein a heat exchanger bypass valve is arranged in the coolant line such that the coolant can be fully or partially conducted past the heat exchanger, and wherein at least one chiller bypass valve is arranged in the coolant line such that the coolant is conducted fully or partially past the at least one chiller; and
a controller including executable instructions stored in non-transitory memory to:
determine an environmental temperature;

determine a required temperature at a coolant inlet of the temperature-increasing device; and
if the environmental temperature is higher than the required temperature, open the at least one chiller bypass valve and close the heat exchanger bypass valve.

2. The system in accordance with claim 1, wherein both the chiller and the condenser are associated with a cooling air flow, and wherein the temperature-increasing device is a battery.

3. The system in accordance with claim 2, wherein the cooling air flow is generated by a fan.

4. The system in accordance with claim 2, wherein the chiller is arranged in front of the condenser in the cooling air flow.

5. The system in accordance with claim 2, wherein the chiller is arranged after the condenser in the cooling air flow.

6. The system in accordance with claim 1, wherein a liquid coolant container for receiving coolant is integrated in the coolant line.

7. The system in accordance with claim 6, wherein a heater is integrated in the liquid coolant container.

8. The system in accordance with claim 3, wherein the fan has an adjustable speed for setting the cooling air flow.

9. A rail vehicle, comprising:
a vehicle coolant circuit for cooling a temperature-increasing device including a battery via a coolant, the coolant circuit comprising:
a coolant line;
a liquid coolant container;
at least one chiller;
a coolant pump;
at least one chiller bypass valve configured such that the coolant is conducted past the at least one chiller;
at least one heat exchanger configured as an evaporator coupling the coolant circuit to a cooling medium circuit, the at least one chiller arranged downstream of the at least one heat exchanger in a direction of flow of the coolant in the coolant circuit; and
a heat exchanger bypass valve configured such that coolant is conducted past the at least one heat exchanger;
the cooling medium circuit comprising:
a cooling medium line;
at least one compressor;
at least one condenser arranged in front of the at least one chiller of the coolant circuit in a cooling air flow; and
at least one relief valve; and
a controller including executable instructions stored in non-transitory memory to:
determine an environmental temperature and a required temperature at a coolant inlet of the battery; and
if the environmental temperature is higher than the required temperature, switch on the at least one compressor, close the heat exchanger bypass valve, and open the at least one chiller bypass valve.

10. The rail vehicle in accordance with claim 9, wherein the cooling air flow is generated by an adjustable speed fan.

11. The rail vehicle in accordance with claim 9, wherein a heater is integrated in the liquid coolant container.

12. The system in accordance with claim 1, wherein the heat exchanger bypass valve is arranged upstream of the at least one chiller bypass valve in the direction of flow of the coolant in the coolant circuit.

13. The rail vehicle in accordance with claim 9, wherein the heat exchanger bypass valve is arranged upstream of the at least one chiller bypass valve in the direction of flow of the coolant in the coolant circuit.

* * * * *